Figure 1:
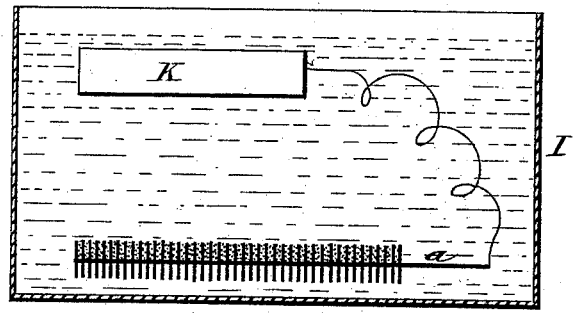
Figure 1:
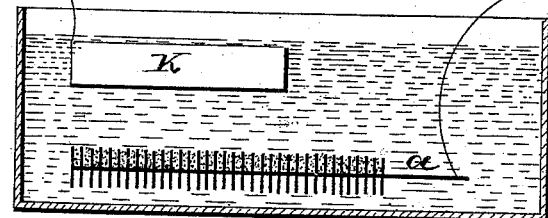
Figure 1:
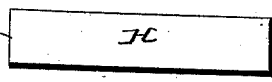

(No Model.)  
2 Sheets—Sheet 1.

C. F. BRUSH.
SECONDARY BATTERY.

No. 445,422. Patented Jan. 27, 1891.

= Case D. =

Fig. 1ª

WITNESSES  
Ernest O. Orsburn  
Jno. Crowell Jr

Charles F. Brush INVENTOR  
By Liggett & Liggett  
ATTORNEYS (No Model.) 2 Sheets—Sheet 2.
C. F. BRUSH.
SECONDARY BATTERY.
No. 445,422. Patented Jan. 27, 1891.
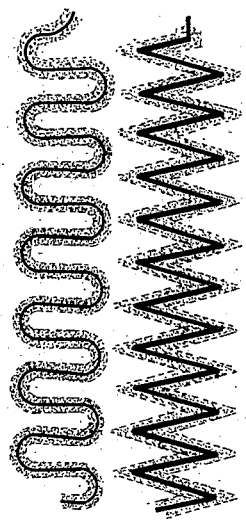
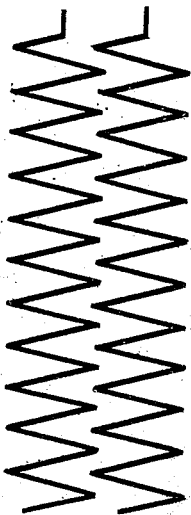
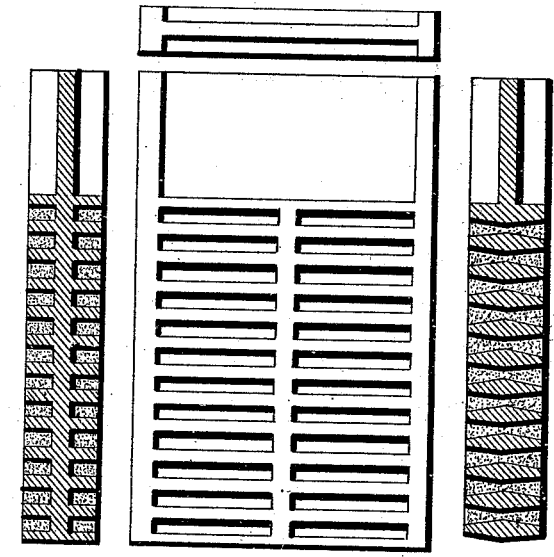
Fig. 2.  Fig. 3.  Fig. 4.  Fig. 5.  Fig. 6.  Fig. 7.
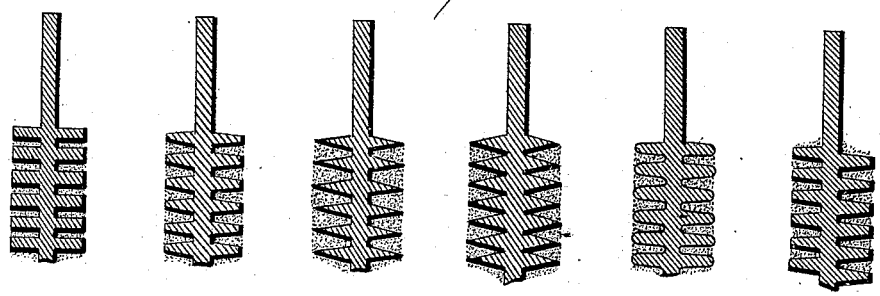
Fig. 8.
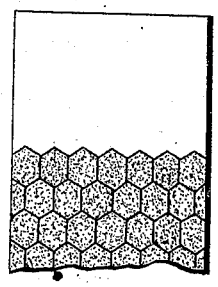
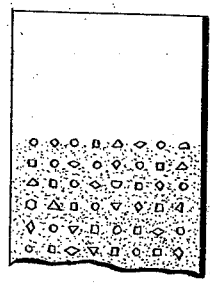
Fig. 9.  Fig. 10.  Fig. 11.
WITNESSES
George Cook
S. G. Nottingham
INVENTOR
Charles F. Brush
By Leggett & Leggett
Attorneys.
THE NORRIS PETERS CO., PHOTO-LITHO., WASHINGTON, D. C.

UNITED STATES PATENT OFFICE.

CHARLES F. BRUSH, OF CLEVELAND, OHIO, ASSIGNOR TO THE BRUSH ELECTRIC COMPANY, OF SAME PLACE.

SECONDARY BATTERY.

SPECIFICATION forming part of Letters Patent No. 445,422, dated January 27, 1891.

Application filed June 9, 1881. Serial No. 35,269. (No model.)

*To all whom it may concern:*

Be it known that I, CHARLES F. BRUSH, of Cleveland, in the county of Cuyahoga and State of Ohio, have invented certain new and useful Improvements in Secondary Batteries, (Case D;) and I do hereby declare the following to be a full, clear, and exact description of the invention, such as will enable others skilled in the art to which it pertains to make and use it, reference being had to the accompanying drawings, which form part of this specification.

My invention relates to secondary batteries or apparatus for the absorption of electric energy and subsequent redevelopment and exhibition of the same; and it consists in a process of producing a peculiar character of electro-deposited active coating upon the body or frame of a secondary-battery element, which coating I have denominated as "spongy metal;" also, in a secondary-battery element provided with a permanent active coating or substance consisting of said spongy metal electrically deposited prior to the use of said element in a secondary battery; also, in a secondary battery having for one or more of its elements a suitable body, frame, or support provided with a permanent active coating or substance electrically deposited thereon prior to its normal use in said secondary battery; also, in a process of making a secondary-battery element by combining with a cast-lead body, frame, or support a suitable active coating or substance added thereto or placed thereon in contradistinction to the process of electrically "forming" an active coating upon a cast-lead body or support, as set forth in United States Patent No. 266,090, granted to me October 17, 1882.

I shall now describe a method of providing a body or support of lead with an electrically-deposited coating of spongy lead. In this process the spongy lead is deposited upon its support by electrical action in the manner customary in any ordinary process of electroplating, the lead plate being first made chemically clean and the plating solution, consisting of acetate or nitrate of lead or of sulphate of lead, dissolved in any suitable neutral saline solution—such, for instance, as that of common salt. Any solution of lead may be employed, provided that it is such as to produce a spongy deposit of metal. If a solution, say, of oxide of lead in a caustic alkali were to be used, the resulting deposit would be not a spongy but a strongly coherent one, such as is particularly referred to and made the special subject of another of my applications filed at the same time herewith, patented March 13, 1882, No. 274,082, and styled "Case E." It is advisable to deposit the spongy metal very slowly, in order that it may have sufficient compactness and continuity to retain its position and perform its functions when in normal use. Corrugated plates, and especially studded, ribbed, grooved, slotted, or otherwise-perforated plate or plates made cellular or provided with receptacles in any manner, are well adapted to receive and retain a coating or filling of spongy metal. The corrugations or receptacles may be entirely filled with the sponge, if desired, and this is a convenient and effective arrangement.

In the accompanying drawings, Figure 1 is a diagram showing a simple method of filling the grooves in a ribbed plate with lead sponge. Fig. 1ª is a similar view showing how the plating-current can be supplied from a dynamo or other suitable electric-current generator. Fig. 2 shows a corrugated plate having its grooves or receptacles filled with electrically-deposited lead or equivalent metal. Fig. 3 illustrates an angularly-corrugated plate provided with an electrically-deposited coating. Fig. 4 shows two angularly-corrugated plates having their folds entering each other. Fig. 5 is a ribbed plate, the ribs being of less thickness than the central plate or support. Fig. 6 represents a plan and top view of a ribbed plate. Fig. 7 shows a vertical section of a slotted or perforated plate. Fig. 8 illustrates several different forms of ribbed plates. Fig. 9 shows a honey-comb plate; Fig. 10, a studded plate, and Fig. 11 a ribbed corrugated plate.

Referring to the drawings in explanation of a process for producing a coating of spongy lead, *a* represents a ribbed or grooved plate or support for receiving an electro-deposited coating. This plate, being first thoroughly cleaned, has the grooves on one of its sides filled with sulphate of lead, either dry or made into a paste with water or saline solution. The plate is then placed horizontally, prepared side up, in a suitable vessel I, containing a solution of common salt or of ammonia or other salt, in which sulphate of lead is somewhat soluble. In the solution and touching the plate $a$ or connected therewith by a wire, as shown, is placed a piece of zinc K. Electrical action is at once set up, by which the sulphate of lead is gradually reduced to the metallic state, while an equivalent quantity of zinc passes into solution as sulphate. When one side of the plate is finished, the other side may be treated in the same manner. Finally the zinc salt is thoroughly removed from the spongy metal by soaking in pure water or water acidulated with sulphuric acid.

A plate K of lead may be employed instead of the zinc plate, with current supplied from some external source, care being taken that the current is not sufficiently strong to evolve hydrogen gas on the plate $a$.

When lead plates, coated or filled with spongy lead, as I have described, are associated together in a secondary battery and charged, the spongy metal of one of the plates is easily and rapidly peroxidized, while the spongy metal of the other plate at the same time absorbs a very large quantity of hydrogen. Thus is produced at once a secondary battery of large storing capacity, and recourse to a tedious forming process becomes unnecessary.

Experiment shows that in a secondary battery having plates as above described the hydrogen-plate is apt to deteriorate to some extent after a time. This defect may be remedied or avoided in the first place by thoroughly peroxidizing both the plates instead of the oxygen-plate only, and then reversing the charge in one of the plates, by which the peroxide thereof is reduced to the metallic state, thus again producing a hydrogen-absorbing plate, but in a better condition than before.

Plates of other metals than lead may be employed to support and form conductors to the lead sponge. Thus, gold or platinum may be used, and in this case the oxygen element of the battery, if fully peroxidized, cannot lose its charge by spontaneous "local action." Carbon, or even copper, may be used in the case of the hydrogen element for receiving the deposited metal.

I make no claim in this patent to a secondary-battery element provided with a coating of electrically-deposited coherent lead or to the process for producing the same, as such subject-matter is described and claimed in my patent No. 274,082, based on application (Case E) which was filed of even date herewith.

Having fully described my invention, what I claim as new, and desire to secure by Letters Patent, is—

1. The method of making a secondary-battery element, consisting in producing on a suitable body, frame, or support a coating or filling of electrically-deposited spongy lead, then immersing the frame or support thus coated in a battery-fluid in which said coating is insoluble, and peroxidizing the coating by electrical action, substantially as set forth.

2. A method or process of making a secondary-battery element, consisting in constructing a suitable body, frame, or support, applying thereto a compound of lead in a saline solution, and decomposing the compound by electrical action, thereby producing upon the frame or support a coating or filling of spongy lead, then immersing the coated support in a battery-fluid in which the coating is insoluble, and peroxidizing the coating by electrical action, substantially as set forth.

3. A method or process of making a secondary-battery element, consisting in constructing a suitable body, frame, or support with cells, grooves, perforations, or other receptacles, placing within said receptacles a compound of lead in a saline solution, decomposing the compound by electrical action, thereby producing a permanent coating or filling of spongy lead, then immersing the coated support in a battery-fluid in which the coating is insoluble, and peroxidizing the coating by electrical action, substantially as set forth.

4. A secondary-battery element provided with a permanent coating or filling of electrically-deposited spongy lead, substantially as set forth.

5. A secondary-battery element provided with a coating or filling of electrically-deposited spongy lead, in combination with a battery-fluid in which said coating is insoluble, substantially as set forth.

6. A secondary-battery element provided with a coating of electrically-deposited spongy lead, said coating being electrically formed, in combination with a battery-fluid in which said coating is insoluble, substantially as set forth.

7. A secondary-battery element constructed with grooves, cells, perforations, or other receptacles and provided with a coating of electrically-deposited spongy lead, in combination with a battery-fluid in which said coating is insoluble, substantially as set forth.

In testimony whereof I have signed my name to this specification in the presence of two subscribing witnesses.

CHARLES F. BRUSH.

Witnesses:
  JNO. CROWELL, Jr.,
  ERNEST O. ORSBURN.